US011410000B2

(12) United States Patent
Hu

(10) Patent No.: US 11,410,000 B2
(45) Date of Patent: Aug. 9, 2022

(54) COMPUTER-IMPLEMENTED METHOD, COMPUTER-IMPLEMENTED DIAGNOSIS METHOD, APPARATUS FOR CLASSIFYING IMAGE, AND COMPUTER-PROGRAM PRODUCT

(71) Applicants: BEIJING BOE HEALTH TECHNOLOGY CO., LTD., Beijing (CN); BOE Technology Group Co., Ltd., Beijing (CN)

(72) Inventor: Xinyue Hu, Beijing (CN)

(73) Assignees: BEIJING BOE HEALTH TECHNOLOGY CO., LTD., Beijing (CN); BOE Technology Group Co., Ltd., Beijing (CN)

( * ) Notice: Subject to any disclaimer, the term of this patent is extended or adjusted under 35 U.S.C. 154(b) by 220 days.

(21) Appl. No.: 16/959,119

(22) PCT Filed: Aug. 8, 2019

(86) PCT No.: PCT/CN2019/099771
§ 371 (c)(1),
(2) Date: Jun. 29, 2020

(87) PCT Pub. No.: WO2021/022543
PCT Pub. Date: Feb. 11, 2021

(65) Prior Publication Data
US 2021/0406590 A1    Dec. 30, 2021

(51) Int. Cl.
*G06K 9/62* (2022.01)
*G06N 3/04* (2006.01)
*G06N 3/08* (2006.01)

(52) U.S. Cl.
CPC ........... *G06K 9/628* (2013.01); *G06K 9/6257* (2013.01); *G06N 3/04* (2013.01); *G06N 3/08* (2013.01)

(58) Field of Classification Search
CPC .... G06K 9/628; G06K 9/6257; G06K 9/6271; G06K 9/6268; G06N 3/04; G06N 3/08;
(Continued)

(56) References Cited

U.S. PATENT DOCUMENTS 10,646,156 B1*  5/2020  Schnorr ................. G06N 3/088
2018/0129893 A1*  5/2018  Son ........................ G06N 3/063
(Continued)

FOREIGN PATENT DOCUMENTS

CN    108830330 A    11/2018
CN    109872325 A    6/2019

OTHER PUBLICATIONS

International Search Report & Written Opinion dated May 7, 2020, regarding PCT/CN2019/099771.
(Continued)

*Primary Examiner* — Juan A Torres
(74) *Attorney, Agent, or Firm* — Intellectual Valley Law, P.C.

(57) ABSTRACT

A computer-implemented method is provided. The computer-implemented method includes classifying an image using a classification model having a residual network. Classifying the image using the classification model includes inputting an input image into the residual network having N number of residual blocks sequentially connected, N≥2, (N−1) number of pooling layers respectively between two adjacent residual blocks of the N number of residual blocks, and (N−1) number of convolutional layers respectively connected to first to (N−1)-th residual blocks of the N number of residual blocks; processing outputs from the first to the (N−1)-th residual blocks of the N number of residual blocks respectively through the (N−1) number of convolutional layers; vectorizing outputs respectively from the (N−1) number of convolutional layers to generate (N−1)
(Continued)

number of vectorized outputs; vectorizing an output from a last residual block of the N number of residual blocks to generate a last vectorized output.

20 Claims, 5 Drawing Sheets

(58) Field of Classification Search
CPC .............. G06N 3/0445; G06N 3/0454; G06V 2201/03; G06V 10/82; G06V 40/193; G06T 7/0012; G06T 2207/20081
USPC ........................................................ 382/157
See application file for complete search history.

(56) References Cited

U.S. PATENT DOCUMENTS

| | | |
|---|---|---|
| 2018/0137388 A1 | 5/2018 | Kim et al. |
| 2018/0315165 A1 | 11/2018 | Navarrete Michelini et al. |
| 2020/0342360 A1* | 10/2020 | Chen .................... G06V 10/454 |
| 2021/0200993 A1* | 7/2021 | Chen .................... G06K 9/6232 |

OTHER PUBLICATIONS

He et al., "Identity Mappings in Deep Residual Networks", Microsoft Research, arXiv:1603.05027v3 [cs.CV] Jul. 25, 2016.
Zeng, "Research on Robust Recognition of Crop Leaf Diseases based on Deep Convolution Neural Network", Chinese Doctoral Dissertations Full-text Database Agriculture Science and Technology, Jan. 15, 2019, pp. 41-43; English translation attached.

* cited by examiner

COMPUTER-IMPLEMENTED METHOD, COMPUTER-IMPLEMENTED DIAGNOSIS METHOD, APPARATUS FOR CLASSIFYING IMAGE, AND COMPUTER-PROGRAM PRODUCT

CROSS-REFERENCE TO RELATED APPLICATION

This application is a national stage application under 35 U.S.C. § 371 of International Application No. PCT/CN2019/099771, filed Aug. 8, 2019, the contents of which are incorporated by reference in the entirety.

TECHNICAL FIELD

The present invention relates to image processing technology, more particularly, to a computer-implemented method, a computer-implemented diagnosis method, an apparatus for classifying an image, and computer-program product.

BACKGROUND

Machine learning and neural networks have been used to analyze images for a variety of purposes such as characterization learning on data. Machine learning and neural networks methods have been developed to identify objects depicted in the images. A neural network is a network with at least one hidden layer, and can form abstract high-level features representing attribute categories by combining lower-level features, so as to find distributed representations of data.

SUMMARY

In one aspect, the present invention provides a computer-implemented method, comprising classifying an image using a classification model comprising a residual network; wherein classifying the image using the classification model comprises inputting an input image into the residual network comprising N number of residual blocks sequentially connected, N≥2, (N−1) number of pooling layers respectively between two adjacent residual blocks of the N number of residual blocks, and (N−1) number of convolutional layers respectively connected to first to (N−1)-th residual blocks of the N number of residual blocks; processing outputs from the first to the (N−1)-th residual blocks of the N number of residual blocks respectively through the (N−1) number of convolutional layers; vectorizing outputs respectively from the (N−1) number of convolutional layers to generate (N−1) number of vectorized outputs; vectorizing an output from a last residual block of the N number of residual blocks to generate a last vectorized output; and concatenating the (N−1) number of vectorized outputs and the last vectorized output together to generate a concatenated output.

Optionally, the computer-implemented method further includes pooling an output from a n-th residual block to generate an n-th intermediate image; and processing the n-th intermediate image through an (n+1)-th residual block, 1≤n≤(N−1); wherein the outputs from the first to the (N−1)-th residual blocks of the N number of residual blocks are respectively processed through the (N−1) number of convolutional layers without pooling.

Optionally, the (N−1) number of pooling layers are (N−1) number of max pooling layers.

Optionally, a respective one of the (N−1) number of convolutional layers is a convolutional layer comprising a 1*1 convolutional kernel, and is configured to reduce a total number of input data channel to 1.

Optionally, classifying the image using the classification model further comprises processing the concatenated output through a full connection layer.

Optionally, a respective one of the N number of residual blocks comprises M number of convolutional blocks with residual skip connections.

Optionally, a respective one of the M number of convolutional blocks comprises a first convolutional layer comprising a 1*1 convolutional kernel, a second convolutional layer comprising a 3*3 convolutional kernel, and a third convolutional layer comprising a 1*1 convolutional kernel sequentially connected.

Optionally, inputting the input image into the residual network comprises processing the input image through a convolutional layer comprising a 7*7 convolutional kernel, positioned before the first residual block of the N number of residual blocks; pooling an output from the convolutional layer positioned before the first residual block; and outputting an intermediate image as an input into the first residual block.

Optionally, the computer-implemented method further includes pre-training the classification model by inputting a plurality of training images into the residual network; inputting a plurality of training categories respectively corresponding to the plurality of training images into the classification model; classifying a respective one of the plurality of training images into one or more predicted categories; computing loss by comparing the one or more predicted categories with one or more of the plurality of training categories assigned to the respective one of the plurality of training images; and tuning the residual network based on the loss.

Optionally, the loss is calculated by $\Sigma_{i=1}^{C} y_n \cdot \log(x_n) + (1 - y_n) \cdot \log(1 - x_n)$; wherein C stands for a total number of the plurality of training categories, $y_n$ stands for the one or more of the plurality of training categories assigned to the respective one of the plurality of training images, and $x_n$ stands for the one or more predicted categories.

Optionally, the computer-implemented method further includes pre-processing the plurality of training images prior to classifying the respective one of the plurality of training images into the one or more predicted categories.

In another aspect, the present invention provides a computer-implemented diagnosis method, comprising classifying a medical image into one or more of a plurality of categories according to the computer-implemented method described herein; wherein the plurality of categories comprise categories corresponding to normal states and diseased states of a plurality of different diseases.

Optionally, the medical image is an image of a fundus of a human eye; and the plurality of different diseases comprise glaucoma, diabetic retinopathy, hypertensive retinopathy.

In another aspect, the present invention provides an apparatus for classifying an image, comprising a memory; one or more processors, wherein the memory and the one or more processors are connected with each other; and the memory stores computer-executable instructions for controlling the one or more processors to input an input image into a residual network comprising N number of residual blocks sequentially connected, N≥2, (N−1) number of pooling layers respectively between two adjacent residual blocks of the N number of residual blocks, and (N−1) number of convolutional layers respectively connected to first to (N−1)-th residual blocks of the N number of residual blocks; process outputs from the first to the (N−1)-th residual blocks of the N number of residual blocks respectively through the (N−1) number of convolutional layers; vectorize outputs respectively from the (N−1) number of convolutional layers to generate (N−1) number of vectorized outputs; vectorizing an output from a last residual block of the N number of residual blocks to generate a last vectorized output; and concatenate the (N−1) number of vectorized outputs and the last vectorized output together to generate a concatenated output; based on an output from the residual network, the memory stores computer-executable instructions for controlling the one or more processors to classify the input image using a classification model comprising the residual network.

Optionally, the memory further stores computer-executable instructions for controlling the one or more processors to pool an output from a n-th residual block to generate an n-th intermediate image; and process the n-th intermediate image through an (n+1)-th residual block, $1 \leq n \leq (N-1)$; wherein the outputs from the first to the (N−1)-th residual blocks of the N number of residual blocks are respectively processed through the (N−1) number of convolutional layers without pooling.

Optionally, the (N−1) number of pooling layers are (N−1) number of max pooling layers.

Optionally, a respective one of the (N−1) number of convolutional layers is a convolutional layer comprising a 1*1 convolutional kernel, and is configured to reduce a total number of input data channel to 1.

Optionally, the memory further stores computer-executable instructions for controlling the one or more processors to process the concatenated output through a full connection layer.

Optionally, a respective one of the N number of residual blocks comprises M number of convolutional blocks with residual skip connections.

Optionally, a respective one of the M number of convolutional blocks comprises a first convolutional layer comprising a 1*1 convolutional kernel, a second convolutional layer comprising a 3*3 convolutional kernel, and a third convolutional layer comprising a 1*1 convolutional kernel sequentially connected.

Optionally, the memory further stores computer-executable instructions for controlling the one or more processors to process the input image through a convolutional layer comprising a 7*7 convolutional kernel, positioned before the first residual block of the N number of residual blocks; pool an output from the convolutional layer positioned before the first residual block; and output an intermediate image as an input into the first residual block.

In another aspect, the present invention provides a computer-program product comprising a non-transitory tangible computer-readable medium having computer-readable instructions thereon, the computer-readable instructions being executable by a processor to cause the processor to perform classifying an image using a classification model comprising a residual network; wherein the computer-readable instructions being executable by the processor to cause the processor to perform inputting an input image into the residual network comprising N number of residual blocks sequentially connected, $N \geq 2$, (N−1) number of pooling layers respectively between two adjacent residual blocks of the N number of residual blocks, and (N−1) number of convolutional layers respectively connected to first to (N−1)-th residual blocks of the N number of residual blocks; processing outputs from the first to the (N−1)-th residual blocks of the N number of residual blocks respectively through the (N−1) number of convolutional layers; vectorizing outputs respectively from the (N−1) number of convolutional layers to generate (N−1) number of vectorized outputs; vectorizing an output from a last residual block of the N number of residual blocks to generate a last vectorized output; and concatenating the (N−1) number of vectorized outputs and the last vectorized output together to generate a concatenated output.

BRIEF DESCRIPTION OF THE FIGURES

The following drawings are merely examples for illustrative purposes according to various disclosed embodiments and are not intended to limit the scope of the present invention.

DETAILED DESCRIPTION

Figure 1:
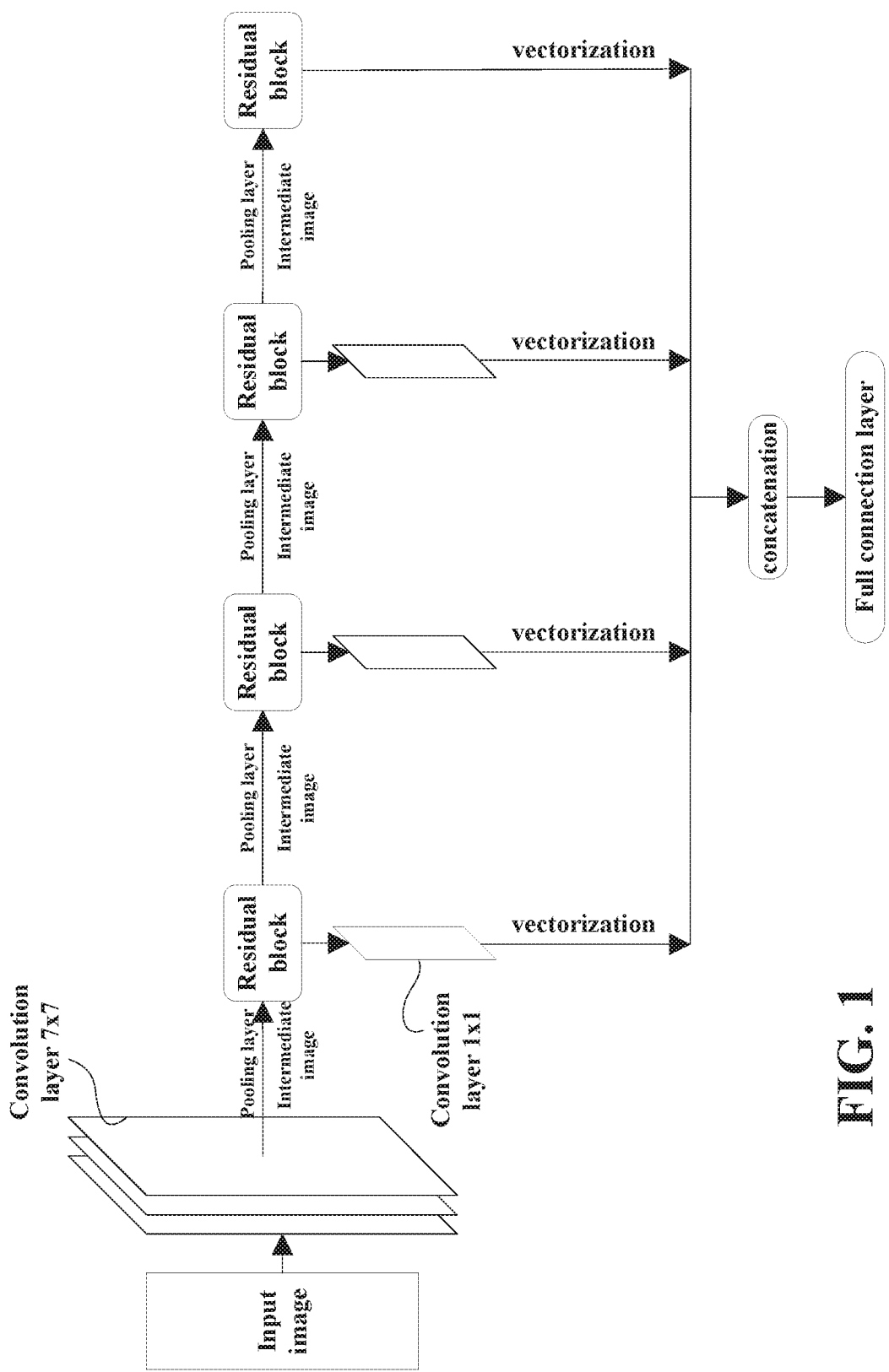
FIG. 1 is a schematic diagram illustrating a residual network in a classification model in some embodiments according to the present disclosure.

The disclosure will now be described more specifically with reference to the following embodiments. It is to be noted that the following descriptions of some embodiments are presented herein for purpose of illustration and description only. It is not intended to be exhaustive or to be limited to the precise form disclosed.

As used herein, the term "convolutional kernel" refers to a two-dimensional matrix used in a convolution process. Optionally, a respective one item of a plurality items in the two-dimensional matrix has a certain value.

As used herein, the term "convolution" refers to a process of processing an image. A convolutional kernel is used for a convolution. For example, each pixel of an input image has a value, a convolutional kernel starts at one pixel of the input image and moves over each pixel in an input image sequentially. At each position of the convolutional kernel, the convolutional kernel overlaps a few pixels on the image based on the size of the convolutional kernel. At a position of the convolutional kernel, a value of one of the few overlapped pixels is multiplied by a respective one value of the convolutional kernel to obtain a multiplied value of one of the few overlapped pixels. Subsequently, all multiplied values of the overlapped pixels are added to obtain a sum corresponding to the position of the convolutional kernel on the input image. By moving the convolutional kernel over each pixel of the input image, all the sums corresponding to all the position of the convolutional kernel are collected and output to form an output image. In one example, a convolution process may extract different features of the input image using different convolutional kernels. In another example, a convolution process may add more features to the input image using different convolutional kernels.

As used herein, the term "convolutional layer" refers to a layer in a convolutional neural network. The convolutional layer is used to perform convolution on an input image to obtain an output image. Optionally, different convolutional kernels are used to perform different convolutions on the same input image. Optionally, different convolutional kernels are used to perform convolutions on different parts of the same input image. Optionally, different convolutional kernels are used to perform convolutions on different input images, for example, multiple images are inputted in a convolutional layer, a respective convolutional kernel is used to perform a convolution on an image of the multiple images. Optionally, different convolutional kernels are used according to different situations of the input image.

As used herein, the term "activation layer" refers to a layer in a convolutional neural network. An activation layer can perform a non-linear mapping on an output signal output from a convolutional layer. Optionally, a convolutional layer includes an activation layer. Various functions may be used in an activation layer. Examples of functions suitable for being adopted in an activation layer include, but are not limited to REL, and sigmoid.

As used herein, the term "down-sampling" refers to a process of extracting features of an input image, and outputting an output image with a smaller scale.

As used herein, the term "pooling" refers to a type of down-sampling. Various methods may be used for pooling. Examples of methods suitable for pooling includes, but are not limited to, max-pooling, avg-polling, decimation, and demuxout.

As used herein, the term "up-sampling" refers to a process of adding more information to an input image, and outputting an outputting image with a larger scale.

As used herein, the term "Muxer layer" refers to a layer in a convolutional neural network. A Muxer layer performs a type of up-sampling. In one example, a plurality of input images are input in the Muxer layer. The Muxer layer rearranges the plurality of input images, and outputs a plurality of output images. The number of the plurality of input images is equivalent to the number of plurality of output images. A size of a respective one of the plurality of output images is larger than a size of one of the plurality of input images. In another example, a 2*2 Muxer layer outputs a plurality of output images having sizes four times larger than sizes of the plurality of input images. For example, four input images having 2*2 size are input in the 2*2 Muxer layer, all the pixels of the four input images are combined and rearranged into four images having 4*4 size, and the four output images having 4*4 size are output from the 2*2 Muxer layer. Examples of Muxer layer include, but are not limited to, the Muxer layer discussed in Chinese Patent Publication Nos. CN107124609A and CN107122826A, and U.S. Patent Publication No. US2018315165A1; the contents of which are incorporated herein by reference in entirety.

As used herein, the term "neural network" refers to a network used for solving artificial intelligence (AI) problems. A neural network includes a plurality of hidden layers. A respective one of the plurality of hidden layers includes a plurality of neurons (e.g. nodes). A plurality of neurons in a respective one of the plurality of hidden layers are connected with a plurality of neurons in an adjacent one of the plurality of hidden layers. Connects between neurons have different weights. The neural network has a structure mimics a structure of a biological neural network. The neural network can solve problems using a non-deterministic manner.

Parameters of the neural network can be tuned by pre-training, for example, a large amount of problems are input in the neural network, and results are obtained from the neural network. Feedbacks on these results is fed back into the neural network to allow the neural network to tune the parameters of the neural network. The pre-training allows the neural network to have a stronger problem-solving ability.

As used herein, the term "convolutional neural network" refers to a deep feed-forward artificial neural network. Optionally, a convolutional neural network includes a plurality of convolutional layers, a plurality of up-sampling layers, and a plurality of down-sampling layers. For example, a respective one of the plurality of convolutional layers can process an image. An up-sampling layer and a down-sampling layer can change a scale of an input image to one corresponding to a certain convolutional layer. The output from the up-sampling layer or the down-sampling layer can then be processed by a convolutional layer of a corresponding scale. This enables the convolutional layer to add or extract a feature having a scale different from that of the input image.

By pre-training, parameters include, but are not limited to, a convolutional kernel, a bias, and a weight of a convolutional layer of a convolutional neural network can be tuned. Accordingly, the convolutional neural network can be used in various applications such as image recognition, image feature extraction, and image feature addition.

As used herein, the term "analysis network" refers to a deep neural network for extracting features. The analysis network is equivalent to a feature extracting segment of an image classification network. The analysis network includes a plurality of convolutional layers sequentially connected. The convolutional layers of the plurality of convolutional layers are in different scales. The analysis network further includes a down-sampling segment disposed between two adjacent convolutional layers of the plurality of convolutional layers. The down-sampling segment transforms the input signal into an output signal having a same scale as the scale of the following adjacent convolutional layer.

As used herein, the term "residual" refers to a difference between an input and an estimation value or a fitting value. An output of a residual network may be acquired by adding an output and an input of convolution cascades and activating a rectified linear unit (ReLU). In this example, a phase of an output of a convolutional layer is identical to a phase of an input of the convolutional layer.

Various illustrative neural networks, residual blocks, layers (e.g., convolutional layers), segments, units, channels, modules, blocks (e.g., convolutional blocks), kernels (e.g., convolutional kernels), and other operations described in connection with the configurations disclosed herein may be implemented as electronic hardware, computer software, or combinations of both. Such neural networks, residual blocks, layers (e.g., convolutional layers), segments, units, channels, modules, blocks (e.g., convolutional blocks), kernels (e.g., convolutional kernels), and operations may be implemented or performed with a general purpose processor, a digital signal processor (DSP), an ASIC or ASSP, an FPGA or other programmable logic device, discrete gate or transistor logic, discrete hardware components, or any combination thereof designed to produce the configuration as disclosed herein. For example, such a configuration may be implemented at least in part as a hard-wired circuit, as a circuit configuration fabricated into an application-specific integrated circuit, or as a firmware program loaded into non-volatile storage or a software program loaded from or into a data storage medium as machine-readable code, such code being instructions executable by an array of logic elements such as a general purpose processor or other digital signal processing unit. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. A software module may reside in a non-transitory storage medium such as RAM (random-access memory), ROM (read-only memory), non-volatile RAM (NVRAM) such as flash RAM, erasable programmable ROM (EPROM), electrically erasable programmable ROM (EEPROM), registers, hard disk, a removable disk, or a CD-ROM; or in any other form of storage medium known in the art. An illustrative storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

A traditional disease detection and classification models typically can only detect a certain disease. To detect multiple diseases, it is necessary to train multiple disease classification models respectively corresponding to multiple diseases, and multiple sets of training images are used respectively for training the multiple disease classification models.

Accordingly, the present disclosure provides, inter alia, a computer-implemented method, a computer-implemented diagnosis method, an apparatus for classifying an image, and computer-program product that substantially obviate one or more of the problems due to limitations and disadvantages of the related art. In one aspect, the present disclosure provides a computer-implemented method. In some embodiments, the computer-implemented method includes classifying an image using a classification model comprising a residual network. In some embodiments, the step of classifying the image using the classification model includes inputting an input image into the residual network comprising N number of residual blocks sequentially connected, N≥2, (N−1) number of pooling layers respectively between two adjacent residual blocks of the N number of residual blocks, and (N−1) number of convolutional layers respectively connected to first to (N−1)-th residual blocks of the N number of residual blocks; processing outputs from the first to the (N−1)-th residual blocks of the N number of residual blocks respectively through the (N−1) number of convolutional layers; vectorizing outputs respectively from the (N−1) number of convolutional layers to generate (N−1) number of vectorized outputs; vectorizing an output from a last residual block of the N number of residual blocks to generate a last vectorized output; and concatenating the (N−1) number of vectorized outputs and the last vectorized output together to generate a concatenated output.

FIG. 1 is a schematic diagram illustrating a residual network in a classification model in some embodiments according to the present disclosure. Referring to FIG. 1, the residual network includes N number of residual blocks sequentially connected, N≥2, (N−1) number of pooling layers respectively between two adjacent residual blocks of the N number of residual blocks, and (N−1) number of convolutional layers respectively connected to first to (N−1)-th residual blocks of the N number of residual blocks.

An input image is processed through the N number of residual blocks sequentially. In some embodiments, the residual network further includes (N−1) number of convolutional layers respectively connected to the first to the (N−1)-th residual blocks of the N number of residual blocks. An output from a respective one of the first to the (N−1)-th residual blocks of the N number of residual blocks is input into a respective one of the (N−1) number of convolutional layers. Outputs from the first to the (N−1)-th residual blocks of the N number of residual blocks are respectively processed through the (N−1) number of convolutional layers. Subsequently, outputs respectively from the (N−1) number of convolutional layers are respectively vectorized to generate (N−1) number of vectorized outputs. An output from a last residual block of the N number of residual blocks is vectorized to generate a last vectorized output. The vectorization operation converts an input matrix into a vector, with a reduction of dimensionality. For example, an input matrix of 56*56*1 may be vectorized into an output vector of a size 3136. The (N−1) number of vectorized outputs and the last vectorized output are concatenated together, to generate a concatenated output. Optionally, the concatenated output is processed through a full connection layer, thereby generating a classification of the input image. Optionally, the output from the full connection layer includes one or more classification vectors.

Referring to FIG. 1, in some embodiments, the residual network further includes (N−1) number of pooling layers respectively between two adjacent residual blocks of the N number of residual blocks. The method in some embodiments includes pooling an output from a n-th residual block to generate an n-th intermediate image; and processing the n-th intermediate image through an (n+1)-th residual block, 1≤n≤(N−1). In one example, the (N−1) number of pooling layers are (N−1) number of max pooling layers. For example, a max pooling operation is performed on the output from the n-th residual block before it is input into the (n+1)-th residual block. A max pooling operation indicates an operation of setting a maximum value within a range in a predetermined size as a representative value of the range. For example, in response to a 2*2 max pooling operation being performed on an input image, a maximum value of 2*2 range of the input image is set to be a representative value of the 2*2 range and other values are omitted.

As shown in FIG. 1, the outputs from the first to the (N−1)-th residual blocks of the N number of residual blocks processed respectively through the (N−1) number of convolutional layers are respectively outputs from the first to the (N−1)-th residual blocks of the N number of residual blocks without pooling. For example, the output from the n-th residual block is input, in parallel, into the n-th convolutional layer of the N number of convolutional layers without pooling, and into a n-th pooling layer of the (N−1) number of pooling layers.

In some embodiments, a respective one of the (N−1) number of convolutional layers is a convolutional layer comprising a 1*1 convolutional kernel, and is configured to reduce a total number of input data channel to 1.

In some embodiments, the residual network further includes a convolutional layer positioned before the first residual block of the N number of residual blocks. As shown in FIG. 1, optionally, a size of a convolutional kernel in the convolutional layer positioned before the first residual block is 7*7. The convolutional layer positioned before the first residual block changes the input image to be in an appropriate form to be received by the N number of residual blocks.

In some embodiments, the residual network further includes a pooling layer connecting the convolutional layer positioned before the first residual block and the first residual block. The pooling layer receives the output from the convolutional layer positioned before the first residual block as an input, and outputs an intermediate image for inputting into the first residual block. In one example, the pooling layer connecting the convolutional layer positioned before the first residual block and the first residual block is a max pooling layer for performing a max pooling operation.

FIG. 1 illustrates an example in which the residual network includes a total four residual blocks. The total number of the residual blocks in the residual network may vary. Optionally, N=5. Optionally, N=6. Optionally, N=8.

In some embodiments, the N number of residual blocks in the residual network have a similar or same structure. Optionally, the N number of residual blocks in the residual network have a same structure, e.g., a total number of convolution kernels in each of the N number of residual blocks is the same. Optionally, the N number of residual blocks in the residual network have a similar structure, e.g., a total number of convolution kernels in each of the N number of residual blocks may vary.

Figure 2:
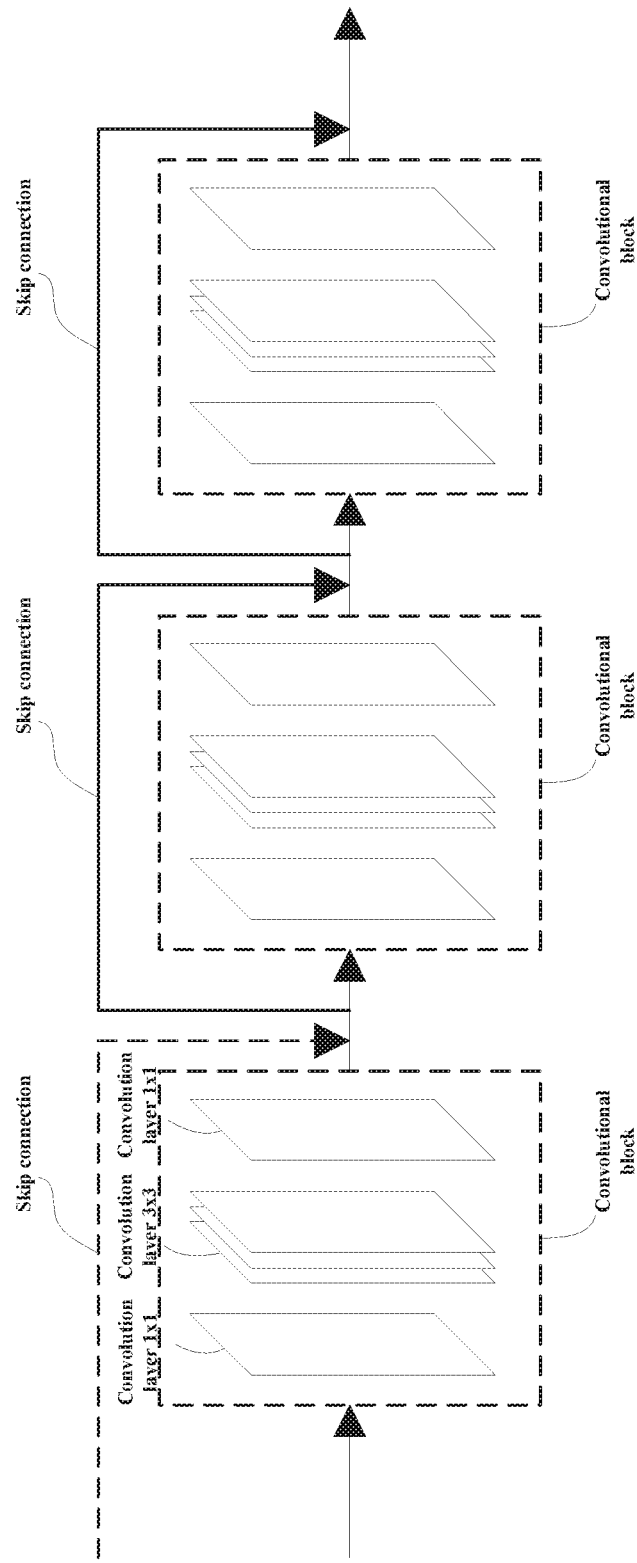
FIG. 2 illustrates the structure of a respective one of N number of residual blocks in a residual network in a classification model in some embodiments according to the present disclosure.

FIG. 2 illustrates the structure of a respective one of N number of residual blocks in a residual network in a classification model in some embodiments according to the present disclosure. Referring to FIG. 2, in some embodiments, a respective one of the N number of residual blocks includes M number of convolutional blocks with residual skip connections. FIG. 2 illustrates an example in which the respective one of the N number of residual blocks includes a total three convolutional blocks. The total number of the convolutional blocks may vary. Optionally, M=4. Optionally, M=5. Optionally, M=6.

Referring to FIG. 2 again, in some embodiments, the respective one of the M number of convolutional blocks includes a first convolutional layer comprising a 1*1 convolutional kernel, a second convolutional layer comprising a 3*3 convolutional kernel, and a third convolutional layer comprising a 1*1 convolutional kernel sequentially connected. In one example, a convolution operation is performed on an image input into the respective one of the M number of convolutional blocks, first by the 1*1 convolutional kernel. The convolution operation is re-performed by the 3*3 convolutional kernel. The result of the convolution operation by the 3*3 convolutional kernel is then subject to another convolution operation by another 1*1 convolutional kernel.

In some embodiments, the respective one of N number of residual blocks further includes one or more skip connections skipping one or more convolutional blocks of the M number of convolutional blocks for performing identity mapping (see, e.g., K. He, X. Zhang, S. Ren, and J. Sun, Identity mappings in deep residual networks, published at arxiv.org/pdf/1603.05027.pdf on Jul. 25, 2016; the entire contents of which is hereby incorporated by reference). Optionally, the skip connection is one in which the input and output are of the same dimensions (indicated as the skip connection with the solid lines in FIG. 2). Optionally, the skip connection is one in which the input and output are of different dimensions, for example, a skip connection with dimension reduction (indicated as the skip connection with the dotted line in FIG. 2). Referring to FIG. 2, the respective one of N number of residual blocks further includes a skip connection with dimension reduction skipping the first convolutional block of the M number of convolutional blocks.

Figure 3:
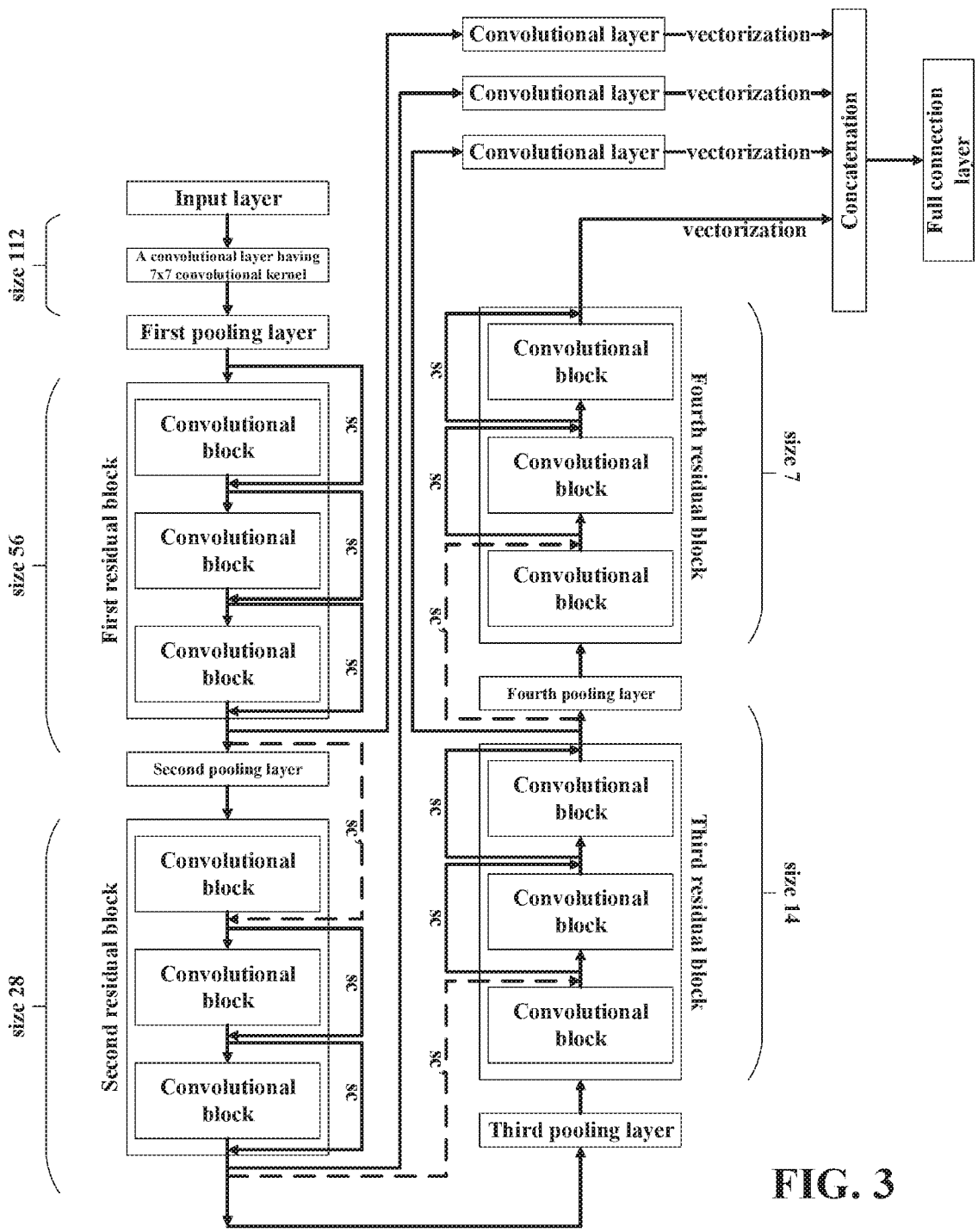
FIG. 3 is a schematic diagram illustrating a residual network in a classification model in some embodiments according to the present disclosure.

FIG. 3 is a schematic diagram illustrating a residual network in a classification model in some embodiments according to the present disclosure. Referring to FIG. 3, the residual network includes four residual blocks, each of which includes three convolutional blocks. The residual network further includes a first pooling layer between the input layer and the first residual block, a second pooling layer between the first residual block and the second residual block, a third pooling layer between the second residual block and the third residual block, and a fourth pooling layer between the third residual block and the fourth residual block. Each of the pooling layers may be, e.g., a max pooling layer. Each of the pooling layers converts an input image into an output image of different scale. For example, the first pooling layer converts an input image of size 112 into an output image of size 56, the second pooling layer converts an input image of size 56 into an output image of size 28, the third pooling layer converts an input image of size 28 into an output image of size 14, and the fourth pooling layer converts an input image of size 14 into an output image of size 7. The output from the first residual block, prior to pooling by the second pooling layer, is parallelly input into a convolutional layer without pooling, and is processed by the convolutional layer. The output from the second residual block, prior to pooling by the third pooling layer, is parallelly input into a convolutional layer without pooling, and is processed by the convolutional layer. The output from the third residual block, prior to pooling by the fourth pooling layer, is parallelly input into a convolutional layer without pooling, and is processed by the convolutional layer. Each of these convolutional layers may be is a convolutional layer comprising a 1*1 convolutional kernel, and is configured to reduce a total number of input data channel to 1. An output from each of these convolutional layers is vectorized. In parallel, an output from the last residual block (the fourth residual block) is also vectorized. Three vectorized outputs respectively from vectorizing outputs from three convolutional layers and the last vectorized output from vectorizing the output from the fourth residual block are concatenated together, the result of which is input into a full connection layer. Optionally, an output from the full connection layer has a size of 1000. By having this structure, not only the convolution results output from the last residual block, but also the convolution results output from all previous residual blocks, may be input into the full connection layer. An enhanced accuracy may be achieved with the present residual network.

Referring to FIG. 3, the residual network includes three skip connections associated with the first residual block, specifically, one skipping the first convolutional block of the first residual block, one skipping the second convolutional block of the first residual block, and one skipping the third convolutional block of the first residual block, all three of which are skip connections in which the input and output are of the same dimensions (indicated as the skip connection sc with the solid lines in FIG. 3).

The residual network includes three skip connections associated with the second residual block, specifically, one skipping the second pooling layer and the first convolutional block of the second residual block, one skipping the second convolutional block of the second residual block, and one skipping the third convolutional block of the second residual block. The skip connection skipping the second pooling layer and the first convolutional block of the second residual block is a skip connection in which the input and output are of different dimensions, for example, a skip connection with dimension reduction (indicated as the skip connection sc' with the dotted line in FIG. 3). The other two skip connections are skip connections in which the input and output are of the same dimensions (indicated as the skip connection sc with the solid lines in FIG. 3).

The residual network includes three skip connections associated with the third residual block, specifically, one skipping the third pooling layer and the first convolutional block of the third residual block, one skipping the second convolutional block of the third residual block, and one skipping the third convolutional block of the third residual block. The skip connection skipping the third pooling layer and the first convolutional block of the third residual block is a skip connection in which the input and output are of different dimensions, for example, a skip connection with dimension reduction (indicated as the skip connection sc' with the dotted line in FIG. 3). The other two skip connections are skip connections in which the input and output are of the same dimensions (indicated as the skip connection sc with the solid lines in FIG. 3).

The residual network includes three skip connections associated with the fourth residual block, specifically, one skipping the fourth pooling layer and the first convolutional block of the fourth residual block, one skipping the second convolutional block of the fourth residual block, and one skipping the third convolutional block of the fourth residual block. The skip connection skipping the fourth pooling layer and the first convolutional block of the fourth residual block is a skip connection in which the input and output are of different dimensions, for example, a skip connection with dimension reduction (indicated as the skip connection sc' with the dotted line in FIG. 3). The other two skip connections are skip connections in which the input and output are of the same dimensions (indicated as the skip connection sc with the solid lines in FIG. 3).

Figure 4:
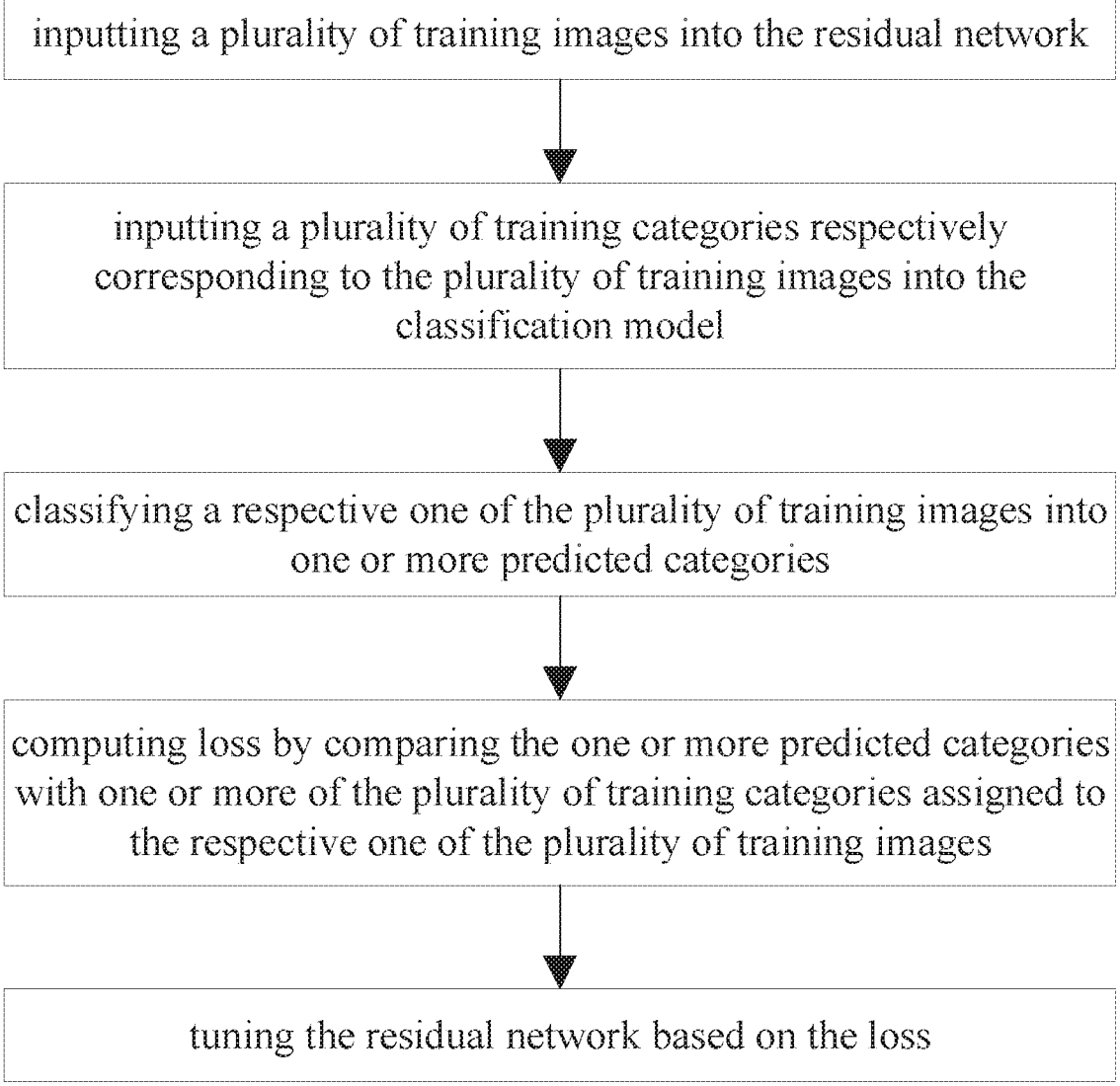
FIG. 4 is a flow chart illustrating a method of classifying an image using a classification model having a residual network in some embodiments according to the present disclosure.

In some embodiments, the method further includes pre-training the classification model. FIG. 4 is a flow chart illustrating a method of classifying an image using a classification model having a residual network in some embodiments according to the present disclosure. Referring to FIG. 4, in some embodiments, the step of pre-training the classification model includes inputting a plurality of training images into the residual network; inputting a plurality of training categories respectively corresponding to the plurality of training images into the classification model; classifying a respective one of the plurality of training images into one or more predicted categories; computing loss by comparing the one or more predicted categories with one or more of the plurality of training categories assigned to the respective one of the plurality of training images; and tuning the residual network based on the loss.

In some embodiments, the loss is calculated by Equation (1):

$$\Sigma_{i=1}^{C} y_n \cdot \log(x_n) + (1-y_n) \cdot \log(1-x_n); \qquad (1)$$

wherein C stands for a total number of the plurality of training categories, $y_n$ stands for the one or more of the plurality of training categories assigned to the respective one of the plurality of training images, and $x_n$ stands for the one or more predicted categories.

In some embodiments, the output from the full connection layer includes one or more classification prediction vectors. The method compares the one or more classification prediction vectors with one or more pre-assigned classification vectors associated with the input training image.

The present method may be used for classifying various appropriate images. In some embodiments, the method is used for classifying a medical image, and the plurality of training images are a plurality of medical images that are pre-classified. In some embodiments, the method is used for classifying an image of a fundus of a human eye, and the plurality of training images are a plurality of images of human eye fundus that are pre-classified as belonging to a normal state or a diseased state. Typically, an image of human eye fundus in a diseased state includes lesions of various sizes. The present method advantageously preserves and retains features of various sizes corresponding to lesions of various sizes, thus is particularly advantageous in classifying images of human eye fundus.

In some embodiments, the method further includes pre-processing the plurality of training images prior to classifying the respective one of the plurality of training images into the one or more predicted categories. Pre-processing the plurality of training images may standardize the training images with a more uniform image quality. Examples of pre-processing methods include image de-redundancy, image adaptive color balance, image alignment, and color correction. Redundant parts of the image may be cropped during image de-redundancy. During the image adaptive color balance, brightness may be redistributed, and contrast may be improved, to enhance details. Optionally, to increase the robustness and generalization of the classification model, a plurality of data enhancement methods may be used to randomly expand the data set, for example, by random cropping, flipping, brightness adjustment, rotation, and a fine transformation of the input image.

In some embodiments, the step of pre-training the classification model may be reiterated multiple times and the residual network may be tuned multiple times to further improve the accuracy of the classification model. Examples of parameters of the classification model that may be tuned include model learning rate, loss function weight, and gradient descent method.

In some embodiments, prior to classifying the image using the classification model, the input image can also be pre-processed by various pre-processing methods and data enhancement methods described above.

In another aspect, the present disclosure provides a computer-implemented diagnosis method by classifying a medical image, as discussed above. In some embodiments, the computer-implemented diagnosis method includes classifying a medical image into one or more of a plurality of categories according to the computer-implemented method described herein. The plurality of categories include categories corresponding to normal states and diseased states of a plurality of different diseases. In one example, the medical image is an image of a fundus of a human eye; and the plurality of different diseases are human eye diseases. Optionally, human eye diseases that may be diagnosed using the present diagnosis method include glaucoma, diabetic retinopathy, hypertensive retinopathy.

A traditional disease detection and classification models typically can only detect a certain disease, for example, a single human eye disease. To detect multiple diseases, it is necessary to train multiple disease classification models respectively corresponding to multiple diseases, and multiple sets of training images are used respectively for training the multiple disease classification models. The present diagnosis method enables detection and classification of multiple diseased states using a single classification model, greatly reducing the time and effort in preparing the training data and training the multiple classification models in the traditional method. For example, the present disclosure enables diagnosing multiple human eye diseases using a single classification model having the modified residual network described herein.

Figure 5:
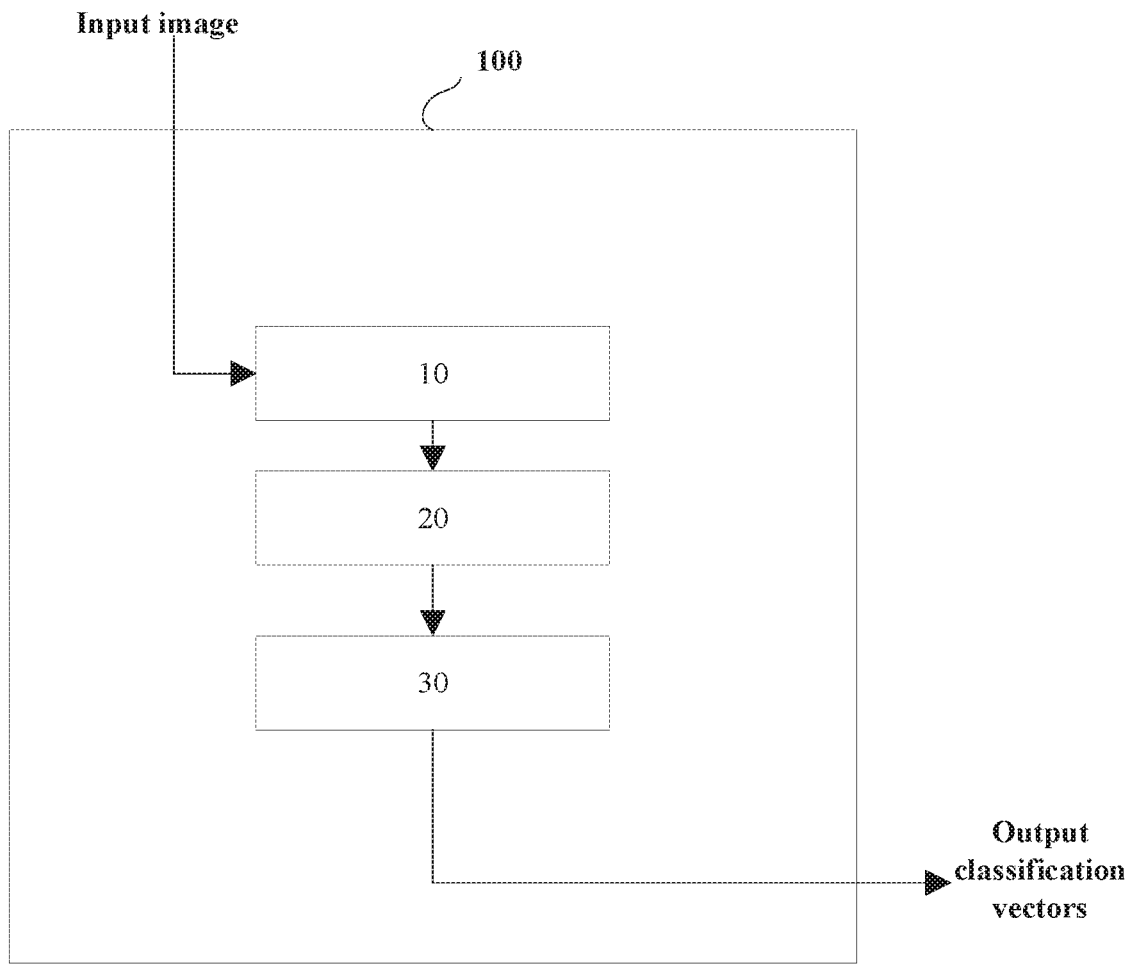
FIG. 5 is a schematic diagram illustrating the structure of an apparatus for classifying an image in some embodiments according to the present disclosure.

In another aspect, the present disclosure provides an apparatus for classifying an image. FIG. 5 is a schematic diagram illustrating the structure of an apparatus for classifying an image in some embodiments according to the present disclosure. Referring to FIG. 5, the apparatus 100 for classifying an image in some embodiments includes one or more processors 10, a memory 20, and a residual network 30 described herein. The memory 20 and the one or more processors 10 are connected with each other. In some embodiments, the memory 20 stores computer-executable instructions for controlling the one or more processors 10 to input an input image into a residual network comprising N number of residual blocks sequentially connected, N≥2, (N−1) number of pooling layers respectively between two adjacent residual blocks of the N number of residual blocks, and (N−1) number of convolutional layers respectively connected to first to (N−1)-th residual blocks of the N number of residual blocks; process outputs from the first to the (N−1)-th residual blocks of the N number of residual blocks respectively through the (N−1) number of convolutional layers; vectorize outputs respectively from the (N−1) number of convolutional layers to generate (N−1) number of vectorized outputs; vectorizing an output from a last residual block of the N number of residual blocks to generate a last vectorized output; and concatenate the (N−1) number of vectorized outputs and the last vectorized output together to generate a concatenated output. Based on an output from the residual network, the memory 20 stores computer-executable instructions for controlling the one or more processors 10 to classify the input image using a classification model comprising the residual network. Optionally, the memory 20 further stores computer-executable instructions for controlling the one or more processors 10 to process the concatenated output through a full connection layer.

In some embodiments, the memory 20 further stores computer-executable instructions for controlling the one or more processors 10 to pool an output from a n-th residual block to generate an n-th intermediate image; and process the n-th intermediate image through an (n+1)-th residual block, 1≤n 5 (N−1). The outputs from the first to the (N−1)-th residual blocks of the N number of residual blocks processed respectively through the (N−1) number of convolutional layers are respectively output prior to the pooling. Optionally, the (N−1) number of pooling layers are (N−1) number of max pooling layers.

Optionally, a respective one of the (N−1) number of convolutional layers is a convolutional layer comprising a 1*1 convolutional kernel, and is configured to reduce a total number of input data channel to 1.

Optionally, a respective one of the N number of residual blocks includes M number of convolutional blocks with residual skip connections. Optionally, a respective one of the M number of convolutional blocks comprises a first convolutional layer comprising a 1*1 convolutional kernel, a second convolutional layer comprising a 3*3 convolutional kernel, and a third convolutional layer comprising a 1*1 convolutional kernel sequentially connected.

In another aspect, the present disclosure provides a computer-program product including a non-transitory tangible computer-readable medium having computer-readable instructions thereon. In some embodiments, the computer-readable instructions are executable by a processor to cause the processor to perform classifying an image using a classification model comprising a residual network. In some embodiments, the computer-readable instructions are executable by the processor to cause the processor to perform inputting an input image into the residual network comprising N number of residual blocks sequentially connected, N≥2, (N−1) number of pooling layers respectively between two adjacent residual blocks of the N number of residual blocks, and (N−1) number of convolutional layers respectively connected to first to (N−1)-th residual blocks of the N number of residual blocks; processing outputs from the first to the (N−1)-th residual blocks of the N number of residual blocks respectively through the (N−1) number of convolutional layers; vectorizing outputs respectively from the (N−1) number of convolutional layers to generate (N−1) number of vectorized outputs; vectorizing an output from a last residual block of the N number of residual blocks to generate a last vectorized output; and concatenating the (N−1) number of vectorized outputs and the last vectorized output together to generate a concatenated output. Optionally, the computer-readable instructions are executable by a processor to cause the processor to perform processing the concatenated output through a full connection layer.

In some embodiments, the computer-readable instructions are executable by a processor to cause the processor to perform pooling an output from a n-th residual block to generate an n-th intermediate image; and processing the n-th intermediate image through an (n+1)-th residual block, 1≤n≤(N−1). The outputs from the first to the (N−1)-th residual blocks of the N number of residual blocks processed respectively through the (N−1) number of convolutional layers are respectively outputs prior to the pooling. Optionally, the (N−1) number of pooling layers are (N−1) number of max pooling layers.

Optionally, a respective one of the (N−1) number of convolutional layers is a convolutional layer including a 1*1 convolutional kernel, and is configured to reduce a total number of input data channel to 1.

Optionally, a respective one of the N number of residual blocks includes M number of convolutional blocks with residual skip connections. Optionally, a respective one of the M number of convolutional blocks comprises a first convolutional layer comprising a 1*1 convolutional kernel, a second convolutional layer comprising a 3*3 convolutional kernel, and a third convolutional layer comprising a 1*1 convolutional kernel sequentially connected.

Examples of computer-program products include various appropriate non-transitory and/or tangible media such as floppy disks, CD-ROMs, hard drives, universal serial bus (USB) drives, the Cloud, or any other machine readable storage medium.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A computer-implemented method, comprising classifying an image using a classification model comprising a residual network;
    wherein classifying the image using the classification model comprises:
    inputting an input image into the residual network comprising N number of residual blocks sequentially connected, N≥2, (N−1) number of pooling layers respectively between two adjacent residual blocks of the N number of residual blocks, and (N−1) number of convolutional layers respectively connected to first to (N−1)-th residual blocks of the N number of residual blocks;
    processing outputs from the first to the (N−1)-th residual blocks of the N number of residual blocks respectively through the (N−1) number of convolutional layers;
    vectorizing outputs respectively from the (N−1) number of convolutional layers to generate (N−1) number of vectorized outputs;
    vectorizing an output from a last residual block of the N number of residual blocks to generate a last vectorized output; and
    concatenating the (N−1) number of vectorized outputs and the last vectorized output together to generate a concatenated output.

2. The computer-implemented method of claim 1, further comprising:
    pooling an output from a n-th residual block to generate an n-th intermediate image; and
    processing the n-th intermediate image through an (n+1)-th residual block, 1≤n≤(N−1);
    wherein the outputs from the first to the (N−1)-th residual blocks of the N number of residual blocks are respectively processed through the (N−1) number of convolutional layers without pooling.

3. The computer-implemented method of claim 2, wherein the (N−1) number of pooling layers are (N−1) number of max pooling layers.

4. The computer-implemented method of claim 1, wherein a respective one of the (N−1) number of convolutional layers is a convolutional layer comprising a 1*1 convolutional kernel, and is configured to reduce a total number of input data channel to 1.

5. The computer-implemented method of claim 1, wherein classifying the image using the classification model further comprises processing the concatenated output through a full connection layer.

6. The computer-implemented method of claim 1, wherein a respective one of the N number of residual blocks comprises M number of convolutional blocks with residual skip connections.

7. The computer-implemented method of claim 6, wherein a respective one of the M number of convolutional blocks comprises a first convolutional layer comprising a 1*1 convolutional kernel, a second convolutional layer comprising a 3*3 convolutional kernel, and a third convolutional layer comprising a 1*1 convolutional kernel sequentially connected.

8. The computer-implemented method of claim 1, wherein inputting the input image into the residual network comprises:
    processing the input image through a convolutional layer comprising a 7*7 convolutional kernel, positioned before the first residual block of the N number of residual blocks;
    pooling an output from the convolutional layer positioned before the first residual block; and
    outputting an intermediate image as an input into the first residual block.

9. The computer-implemented method of claim 1, further comprising pre-training the classification model by:
    inputting a plurality of training images into the residual network;
    inputting a plurality of training categories respectively corresponding to the plurality of training images into the classification model;
    classifying a respective one of the plurality of training images into one or more predicted categories;
    computing loss by comparing the one or more predicted categories with one or more of the plurality of training categories assigned to the respective one of the plurality of training images; and
    tuning the residual network based on the loss.

10. The computer-implemented method of claim 9, wherein the loss is calculated by $\Sigma_{i=1}^{C} y_n \cdot \log(x_n) + (1-y_n) \cdot \log(1-x_n)$;
    wherein C stands for a total number of the plurality of training categories, $y_n$ stands for the one or more of the plurality of training categories assigned to the respective one of the plurality of training images, and $x_n$ stands for the one or more predicted categories.

11. The computer-implemented method of claim 9, further comprising pre-processing the plurality of training images prior to classifying the respective one of the plurality of training images into the one or more predicted categories.

12. A computer-implemented diagnosis method, comprising:
    classifying a medical image into one or more of a plurality of categories according to the computer-implemented method of claim 1;
    wherein the plurality of categories comprise categories corresponding to normal states and diseased states of a plurality of different diseases.

13. The computer-implemented diagnosis method of claim 12, wherein the medical image is an image of a fundus of a human eye; and
    the plurality of different diseases comprise glaucoma, diabetic retinopathy, hypertensive retinopathy.

14. An apparatus for classifying an image, comprising:
    a memory;
    one or more processors;
    wherein the memory and the one or more processors are connected with each other; and the memory stores computer-executable instructions for controlling the one or more processors to:
input an input image into a residual network comprising N number of residual blocks sequentially connected, N≥2, (N−1) number of pooling layers respectively between two adjacent residual blocks of the N number of residual blocks, and (N−1) number of convolutional layers respectively connected to first to (N−1)-th residual blocks of the N number of residual blocks;
process outputs from the first to the (N−1)-th residual blocks of the N number of residual blocks respectively through the (N−1) number of convolutional layers;
vectorize outputs respectively from the (N−1) number of convolutional layers to generate (N−1) number of vectorized outputs;
vectorize an output from a last residual block of the N number of residual blocks to generate a last vectorized output; and
concatenate the (N−1) number of vectorized outputs and the last vectorized output together to generate a concatenated output;
based on an output from the residual network, the memory stores computer-executable instructions for controlling the one or more processors to classify the input image using a classification model comprising the residual network.

15. The apparatus of claim 14, wherein the memory further stores computer-executable instructions for controlling the one or more processors to:
pool an output from a n-th residual block to generate an n-th intermediate image; and
process the n-th intermediate image through an (n+1)-th residual block, 1≤n≤(N−1);
wherein the outputs from the first to the (N−1)-th residual blocks of the N number of residual blocks are respectively processed through the (N−1) number of convolutional layers without pooling.

16. The apparatus of claim 15, wherein the (N−1) number of pooling layers are (N−1) number of max pooling layers.

17. The apparatus of claim 15, wherein a respective one of the N number of residual blocks comprises M number of convolutional blocks with residual skip connections.

18. The apparatus of claim 14, wherein a respective one of the (N−1) number of convolutional layers is a convolutional layer comprising a 1*1 convolutional kernel, and is configured to reduce a total number of input data channel to 1.

19. The apparatus of claim 14, wherein the memory further stores computer-executable instructions for controlling the one or more processors to process the concatenated output through a full connection layer.

20. A computer-program product comprising a non-transitory tangible computer-readable medium having computer-readable instructions thereon, the computer-readable instructions being executable by a processor to cause the processor to perform classifying an image using a classification model comprising a residual network;
wherein the computer-readable instructions being executable by the processor to cause the processor to perform:
inputting an input image into the residual network comprising N number of residual blocks sequentially connected, N≥2, (N−1) number of pooling layers respectively between two adjacent residual blocks of the N number of residual blocks, and (N−1) number of convolutional layers respectively connected to first to (N−1)-th residual blocks of the N number of residual blocks;
processing outputs from the first to the (N−1)-th residual blocks of the N number of residual blocks respectively through the (N−1) number of convolutional layers;
vectorizing outputs respectively from the (N−1) number of convolutional layers to generate (N−1) number of vectorized outputs;
vectorizing an output from a last residual block of the N number of residual blocks to generate a last vectorized output; and
concatenating the (N−1) number of vectorized outputs and the last vectorized output together to generate a concatenated output.

* * * * *